United States Patent
Hasegawa et al.

(10) Patent No.: US 9,678,274 B2
(45) Date of Patent: Jun. 13, 2017

(54) OPTICAL FIBER CUTTER

(75) Inventors: Masahiro Hasegawa, Yokohama (JP); Tsuyoshi Tada, Yokohama (JP); Toshihiko Homma, Yokohama (JP)

(73) Assignees: SEI Optifrontier Co., Ltd., Yokohama-shi, Kanagawa (JP); SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 381 days.

(21) Appl. No.: 14/238,295

(22) PCT Filed: Aug. 3, 2012

(86) PCT No.: PCT/JP2012/069898
§ 371 (c)(1),
(2), (4) Date: Feb. 11, 2014

(87) PCT Pub. No.: WO2013/024723
PCT Pub. Date: Feb. 21, 2013

(65) Prior Publication Data
US 2014/0151425 A1    Jun. 5, 2014

(30) Foreign Application Priority Data
Aug. 12, 2011  (JP) .................................. 2011-176989

(51) Int. Cl.
G02B 6/25      (2006.01)
B26D 7/28      (2006.01)

(52) U.S. Cl.
CPC ................. *G02B 6/25* (2013.01); *B26D 7/28* (2013.01); *Y10S 83/913* (2013.01); *Y10T 83/544* (2015.04); *Y10T 225/321* (2015.04)

(58) Field of Classification Search
CPC  G02B 6/25; B26D 7/28; Y10S 83/913; Y10T 225/321; Y10T 83/544; Y10T 225/325
(Continued)

(56) References Cited

U.S. PATENT DOCUMENTS 4,421,000 A * 12/1983 Murphy .................... B26F 1/04
                                                234/108
4,637,289 A *  1/1987 Ramsden ............... B23Q 11/00
                                                 83/380
(Continued)

FOREIGN PATENT DOCUMENTS

CN         101231366        7/2008
CN         201107427        8/2008
(Continued)

OTHER PUBLICATIONS

JP2008/203815 translation; Honma Toshihiko; Jan. 23, 2007.*

*Primary Examiner* — Laura M Lee
(74) *Attorney, Agent, or Firm* — Drinker Biddle & Reath LLP

(57) ABSTRACT

An optical fiber cleaver includes a cleaver base body having a holder guide portion which positions a fiber holder holding an optical fiber, and a cleaver lid body attached to the cleaver base body to be openable and closable. A slider having a blade member piercing the optical fiber is attached to the cleaver base body to be movable in a width direction. A pawl member is arranged in one sidewall of the holder guide portion. Further, a count indication mechanism which counts and indicates the number of times the slider returns to an initial position is provided in the cleaver base body. The optical fiber cleaver is configured to enable a counting operation of the count indication mechanism only when the fiber holder is set in the holder guide portion such that the pawl member is pressed.

2 Claims, 13 Drawing Sheets

(58) Field of Classification Search
USPC .... 83/913, 522.29, 72, 76.7–76.8, 368, 370, 83/372; 225/96, 96.5; 385/134
See application file for complete search history.

(56) References Cited

U.S. PATENT DOCUMENTS

| | | | | |
|---|---|---|---|---|
| 2013/0095732 A1* | 4/2013 | Christopher | ............. | G02B 6/25 451/54 |
| 2014/0299645 A1* | 10/2014 | Lurie | ....................... | G02B 6/25 225/96 |

FOREIGN PATENT DOCUMENTS

| | | |
|---|---|---|
| EP | 1734387 | 12/2006 |
| FR | 2550862 | 2/1985 |
| JP | S54-130462 | 9/1979 |
| JP | H2-062405 | 5/1990 |
| JP | 2000-301487 | 10/2000 |
| JP | 3497998 | 2/2004 |
| JP | 2006-058474 | 3/2006 |
| JP | 2008-203815 | 9/2008 |
| JP | 2009-119117 | 6/2009 |
| KR | 2008-0069528 | 7/2008 |
| KR | 10-2009-0081179 | 7/2009 |
| WO | WO 2005/088370 | 9/2005 |

\* cited by examiner

*Fig.5*
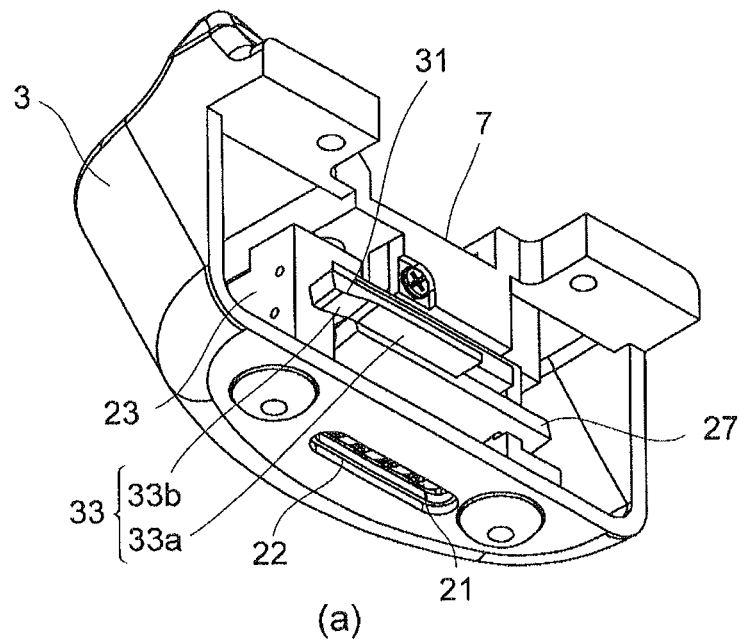
(a)
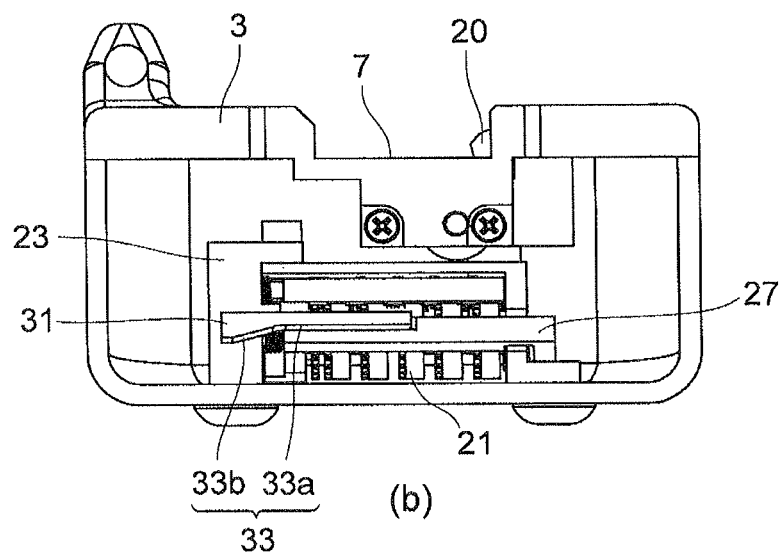
(b)

Fig.6
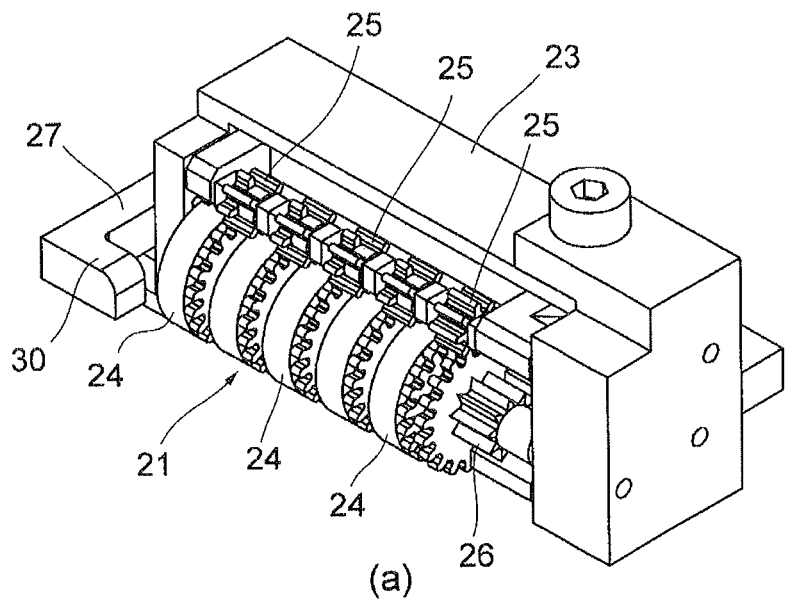
(a)
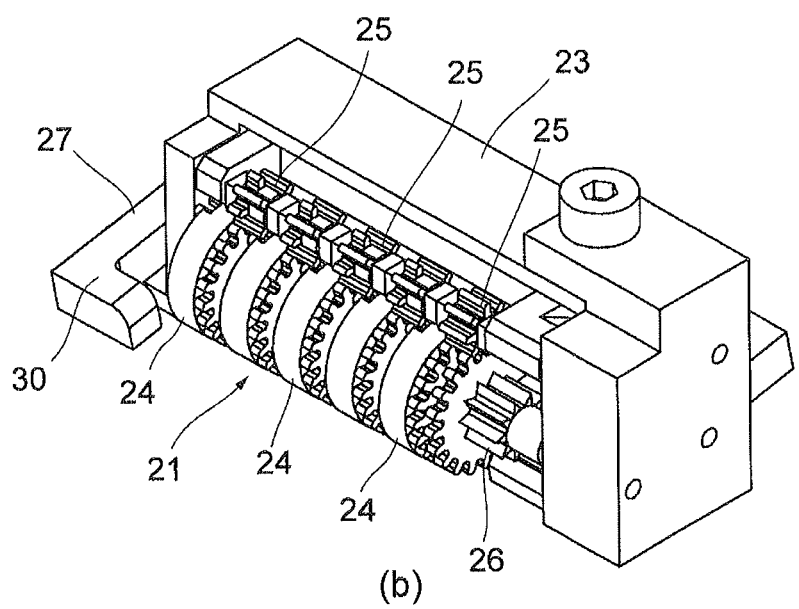
(b)

Fig.8
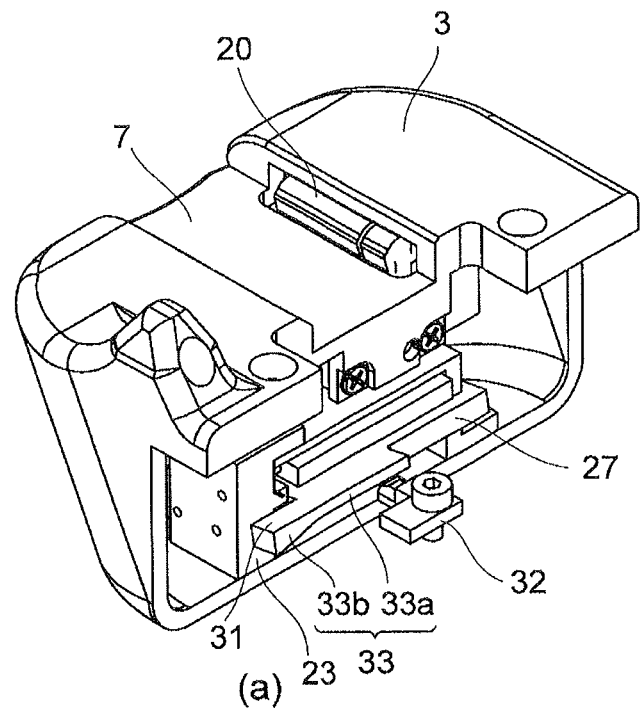
(a)
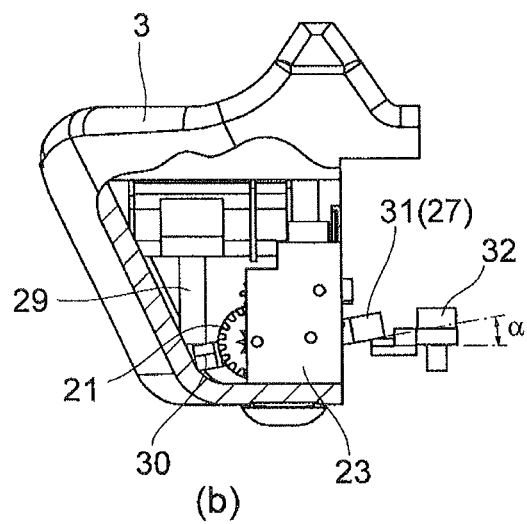
(b)

*Fig.10*
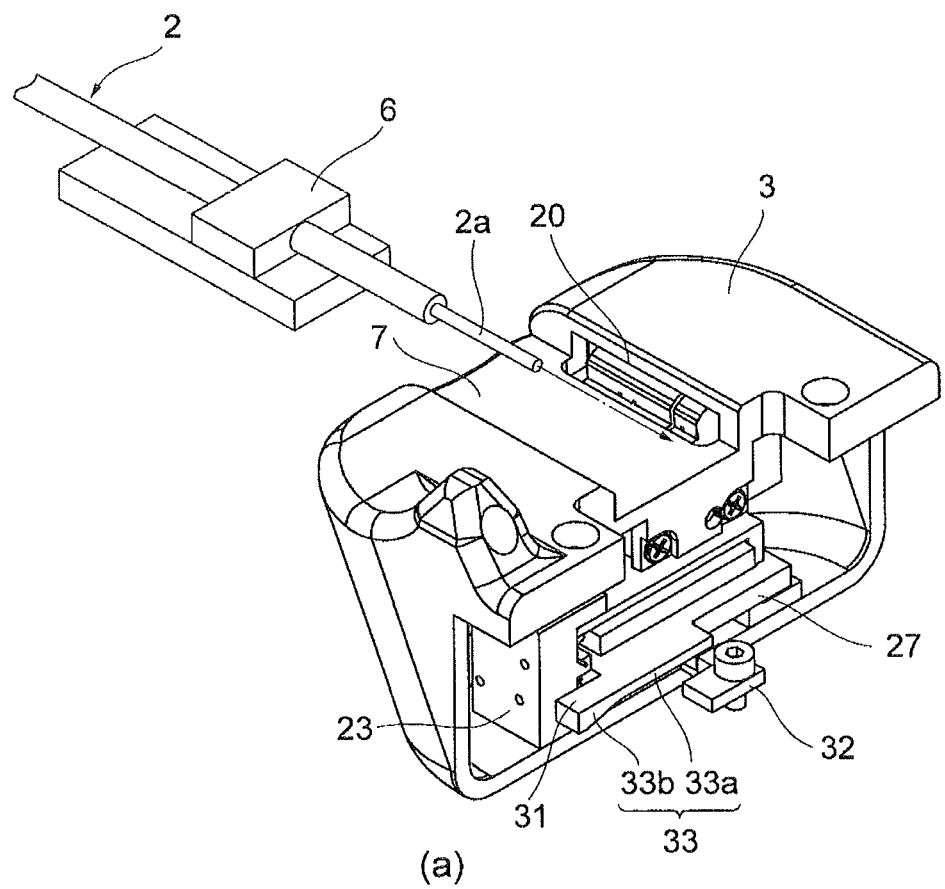
(a)
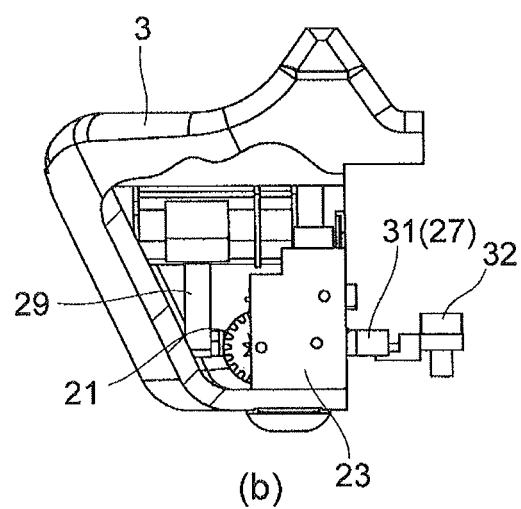
(b)

Fig.13
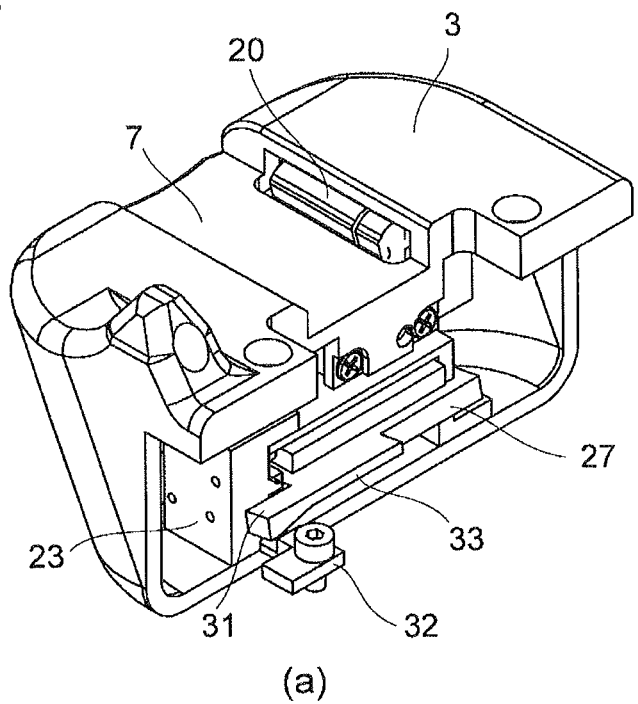
(a)
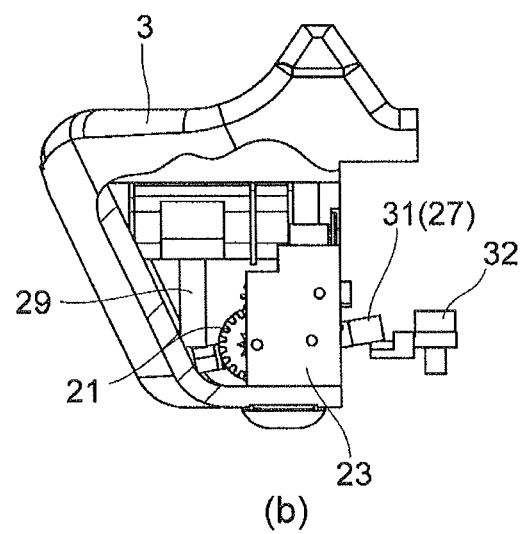
(b)

OPTICAL FIBER CUTTER

TECHNICAL FIELD

The present invention relates to an optical fiber cleaver which cuts an optical fiber.

BACKGROUND ART

As a conventional optical fiber cleaver, an optical fiber cleaver including a lower box body (cleaver base body) having a fiber placement portion which positions a fiber holder holding an optical fiber, an upper box body (cleaver lid body) rotatably connected to one end of this lower box body through a hinge member, and a support frame (slider) movably supported by the lower box body and rotatably supporting a disc-shaped blade member for piercing a glass fiber portion of the optical fiber is known as described in, for example, Patent Literature 1.

Further, an optical fiber cleaver includes an optical fiber cleaver in which an optical fiber is pressed by a fiber clamp on a plate spring, a blade is then pressed against the optical fiber by lowering a cover such that the optical fiber is initially pierced, and a count button is pressed against the plate spring such that an accumulative number of uses of the blade is counted and displayed (e.g., Patent Literature 2).

CITATION LIST

Patent Literature

[Patent Literature 1] Japanese Patent Laid-Open No. 2008-203815
[Patent Literature 2] Japanese Utility Model Laid-Open No. H2-62405

SUMMARY OF INVENTION

Technical Problem

However, the following problems are associated with the prior arts described above. In other words, when Patent Literature 2 is applied to Patent Literature 1, the number of movements of the slider is counted as the number of cuts of the optical fiber by the blade member. However, the count is performed by regarding the optical fiber as having been cut even when the slider is moved in a state in which the fiber holder holding the optical fiber is not set in a fiber placement portion. Therefore, the number of cuts of the optical fiber cannot be precisely counted and indicated.

An object of the present invention is to provide an optical fiber cleaver capable of precisely counting and indicating the number of cuts of an optical fiber.

Solution to Problem

The present invention is characterized in that an optical fiber cleaver for cutting an optical fiber includes: a cleaver base body including a holder guide portion which positions a fiber holder holding the optical fiber; a slider movably attached to the cleaver base body and including a blade member which pierces the optical fiber; a cleaver lid body attached to the cleaver base body to be openable and closable and moving the slider to return to an initial position by closing with respect to the cleaver base body; a count indication mechanism provided in the cleaver base body for counting and indicating the number of times the slider returns to the initial position; and a control means which mechanically controls the count indication mechanism to enable a counting operation of the count indication mechanism only when the fiber holder is set in the holder guide portion.

When a task of cutting the optical fiber using such an optical fiber cleaver of the present invention is performed, the slider is pressed and moved from the initial position, the fiber holder holding the optical fiber is set in the fiber guide portion of the cleaver base body, and the cleaver lid body is closed with respect to the cleaver base body in this state such that the slider is moved to return to the initial position. Then, the optical fiber is pierced by the blade member provided in the slider, and the optical fiber is cut.

In this case, by providing the control means which mechanically controls the count indication mechanism to enable the counting operation of the count indication mechanism only when the fiber holder is set in the holder guide portion, the number of times the slider returns to the initial position is not counted by the count indication mechanism even when the slider is moved to return to the initial position in a state in which the fiber holder is not set in the holder guide portion. Accordingly, it is possible to precisely count and indicate the number of cuts of the optical fiber using the count indication mechanism.

The control means includes a pawl member provided in the holder guide portion and pressed when the fiber holder is set in the holder guide portion; and a rotation driving means which rotates the count indication mechanism by an angle corresponding to 1 count only when the slider returns to the initial position in a state in which the pawl member is pressed. In this case, when the fiber holder is set in the holder guide portion, the pawl member is pressed, and when the slider returns to the initial position in this state, the count indication mechanism is rotated by an angle corresponding to 1 count. On the other hand, when the fiber holder is not set in the holder guide portion, the pawl member is not pressed, and therefore the count indication mechanism is not rotated by an angle corresponding to 1 count even when the slider returns to the initial position. Accordingly, the counting operation of the count indication mechanism is enabled only when the fiber holder is set in the holder guide portion.

In this case, the rotation driving means includes a projecting portion provided in the slider; a rotation member provided in the cleaver base body to rotate in interlock with the pawl member and including an engagement portion which engages with the projecting portion when the pawl member is pressed; an auxiliary gear attached to the count indication mechanism; and an engagement piece provided in the rotation member and engaging with the auxiliary gear. When the fiber holder is set in the holder guide portion and the pawl member is pressed, the rotation member rotates in interlock with it and the engagement portion of the rotation member engages with the projecting portion provided in the slider. In this state, when the slider returns to the initial position, the engagement piece provided in the rotation member engages with the auxiliary gear, the auxiliary gear is rotated by an angle (36 degrees) corresponding to 1 count, and the count indication mechanism is rotated by the same angle. Thus, it is possible to realize the rotation driving means with a simple structure.

In this case, the engagement portion includes an inclined surface inclined to rotate the rotation member as the projecting portion is directed to the initial position in a state in which the pawl member is pressed, the number of engagement pieces is 2, and the two engaging pieces engage with the auxiliary gear in different positions and at different timings. In this case, when the slider returns to the initial position, the projecting portion passes the inclined surface of the engagement portion such that the rotation member rotates. Therefore, one engagement piece engages with the auxiliary gear, the auxiliary gear is rotated by a predetermined angle, and accordingly the count indication mechanism is rotated by the same angle. Also, when the projecting portion passes the inclined surface of the engagement portion, the rotation member rotates in an opposite direction to enter an original state (a normal state when the pawl member is pressed), and therefore the other engagement piece engages with the auxiliary gear, the auxiliary gear is rotated by a predetermined angle in the same direction, and accordingly the count indication mechanism is rotated by the same angle. It is possible to reliably rotate the count indication mechanism by an angle (36 degrees) corresponding to 1 count by causing the engaging pieces to engage with the auxiliary gear twice in this way.

Advantageous Effects of Invention

According to the present invention, it is possible to precisely count and indicate the number of cuts of the optical fiber. Accordingly, for example, a user can know a correct lifespan and exchange time of the blade member.

BRIEF DESCRIPTION OF DRAWINGS

FIG. 5 is a perspective view and a side view illustrating an internal structure of the front portion of the cleaver base body illustrated in FIG. 1.

FIG. 6 is a perspective view illustrating a count indication mechanism illustrated in FIG. 5.

FIG. 8 is a perspective view and a cross-sectional view illustrating an internal structure of the front portion of the cleaver base body when the fiber holder illustrated in FIG. 1 is not set in the holder guide portion.

FIG. 10 is a perspective view and a cross-sectional view illustrating the front portion of the cleaver base body when the fiber holder illustrated in FIG. 1 is set in the holder guide portion.

FIG. 13 is a perspective view and a cross-sectional view illustrating the front portion of the cleaver base body when the slider illustrated in FIG. 2 is further moved to the initial position.

DESCRIPTION OF EMBODIMENTS

Hereinafter, a preferred embodiment of an optical fiber cleaver according to the present invention will be described in detail with reference to the drawings.

Figure 1:
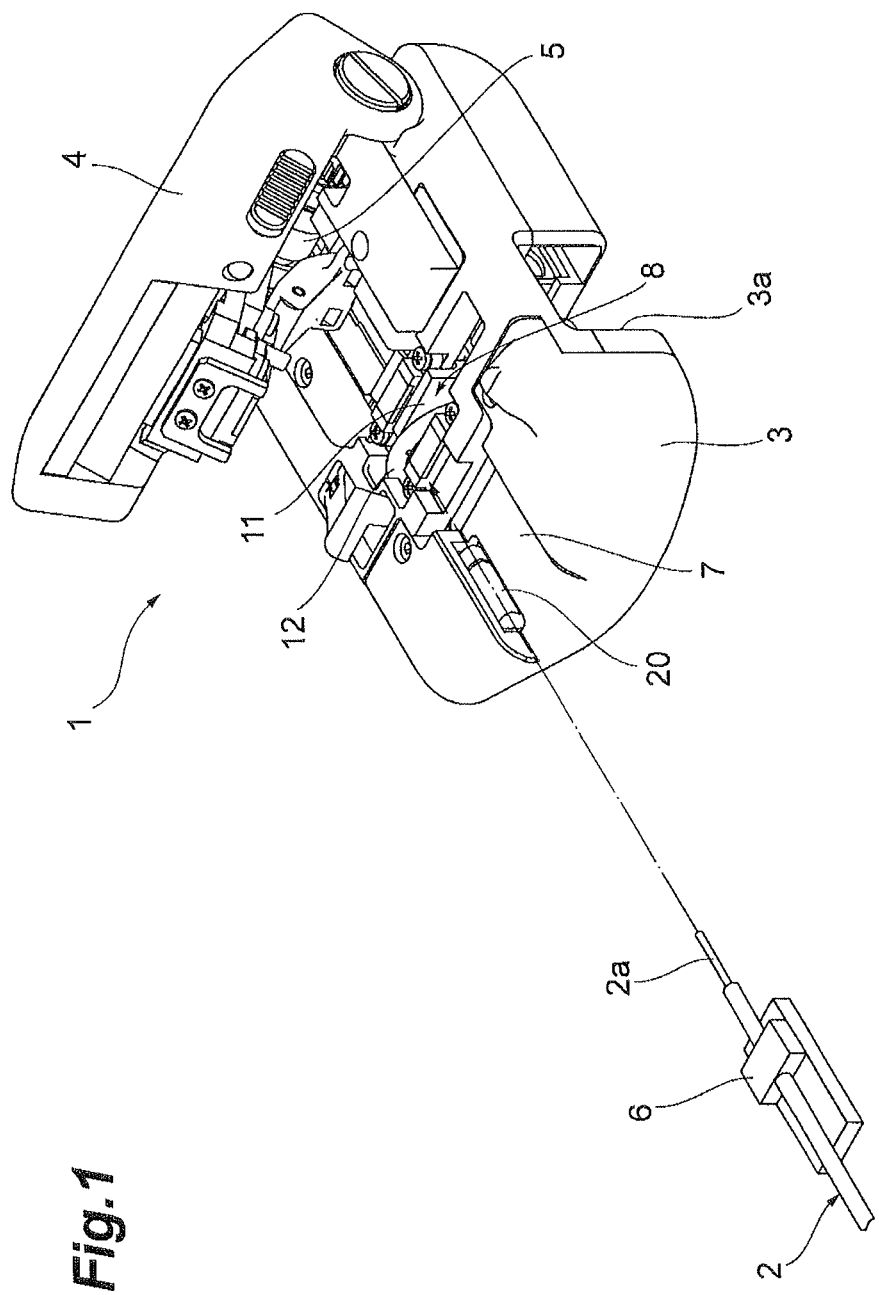
FIG. 1 is a perspective view illustrating an embodiment of an optical fiber cleaver according to the present invention.

FIG. 1 is a perspective view illustrating an embodiment of an optical fiber cleaver according to the present invention. In FIG. 1, the optical fiber cleaver 1 of the present embodiment cuts a glass fiber 2a exposed by removing a coating of a distal portion of the optical fiber 2.

The optical fiber cleaver 1 includes a cleaver base body 3, and a cleaver lid body 4 attached to this cleaver base body 3 to be openable and closable. The cleaver lid body 4 is rotatably connected through a shaft portion 5 extending in a width direction of the cleaver base body 3 in a rear end portion of the cleaver base body 3. A substantially rectangular concave holder guide portion 7 which positions the fiber holder 6 holding the optical fiber 2 to be cut is formed in an upper surface of the cleaver base body 3.

A pawl member 20 is arranged in one sidewall of the holder guide portion 7. The pawl member 20 projects due to biasing force of a spring (not illustrated) in a normal state in which the fiber holder 6 is not set in the holder guide portion 7. When the fiber holder 6 is set in the holder guide portion 7, the pawl member 20 is pressed toward the sidewall and retracted against the biasing force of the spring (see FIG. 10).

Figure 2:
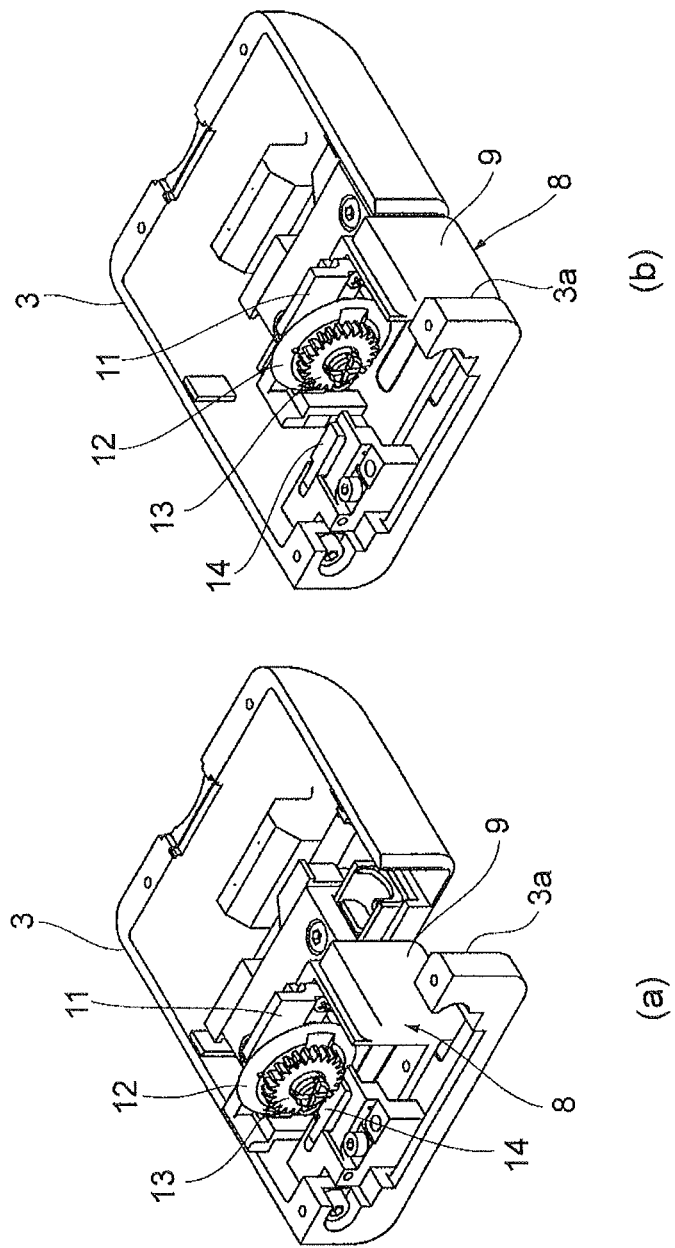
FIG. 2 is a perspective view illustrating an internal structure except for a front portion of a cleaver base body illustrated in FIG. 1.
Figure 3:
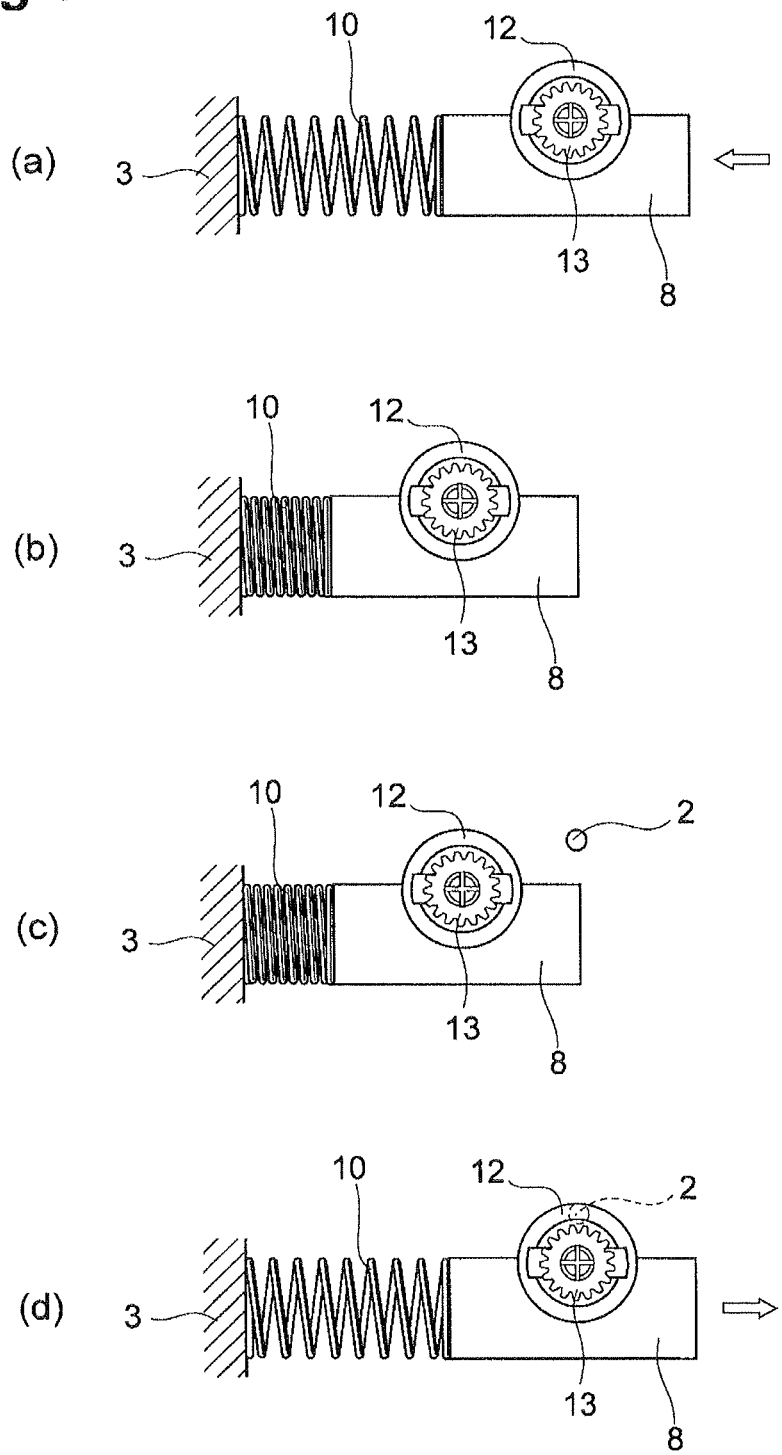
FIG. 3 is a conceptual view illustrating a state in which an optical fiber is pierced by the optical fiber cleaver illustrated in FIG. 1.

The slider 8 is attached to a rear side (shaft portion 5) of the holder guide portion 7 in the cleaver base body 3. The slider 8 can be moved in the width direction of the cleaver base body 3, as illustrated in FIG. 2. A pressing wall portion 9 is provided in one end portion of the slider 8. An opening portion 3a for exposing the pressing wall portion 9 is formed in one sidewall of the cleaver base body 3. A spring 10 (see FIG. 3) which biases the slider 8 to the opening portion 3a side is provided between the other end portion of the slider 8 and the other sidewall of the cleaver base body 3. The slider 8 is usually in an initial position as illustrated in FIG. 2(b) due to the biasing force of the spring 10.

The disc-shaped blade member 12 piercing the glass fiber 2a of the optical fiber 2 is rotatably supported by the support wall portion 11 of the slider 8. The circular gear 13 is attached to the blade member 12, and the blade member 12 and the gear 13 are integrally rotatable. An arm member 14 engaging with the gear 13 is provided in a portion on the opposite side of the opening portion 3a in the cleaver base body 3.

When a task of cutting the optical fiber 2 is performed using such an optical fiber cleaver 1, the pressing wall portion 9 of the slider 8 is first pressed, as illustrated in FIG. 3(a), in a state in which the cleaver lid body 4 opens with respect to the cleaver base body 3. Then, the slider 8 moves to an opposite side of the opening portion 3a against the biasing force of the spring 10 and reaches a cut start position, as illustrated in FIGS. 2(a) and 3(b). In this case, the slider 8 is held in the cut start position by a locking structure (not illustrated) provided in the cleaver base body 3.

Further, the arm member 14 engages with the gear 13 such that the gear 13 is rotated by a predetermined amount and accordingly the blade member 12 is rotated by a predetermined amount. Therefore, each time the slider 8 reaches the cut start position, a portion of the blade member 12 coming in contact with the optical fiber 2 is displaced by a predetermined amount. Accordingly, it is possible to increase a lifespan of the blade member 12.

In this state, the fiber holder 6 holding the optical fiber 2 is set in the holder guide portion 7 of the cleaver base body 3, as illustrated in FIG. 1. Accordingly, the optical fiber 2 is positioned with respect to the slider 8, as illustrated in FIG. 3(c).

Figure 4:
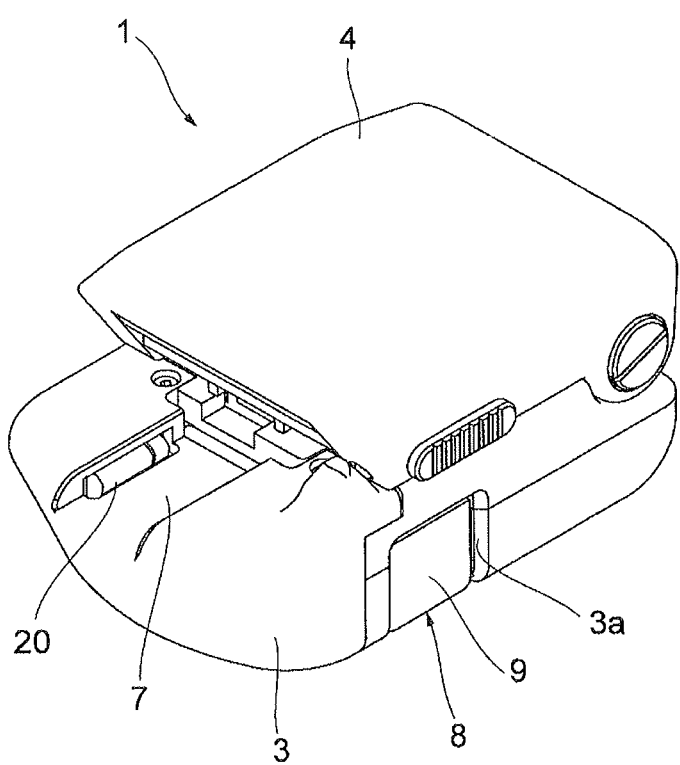
FIG. 4 is a perspective view illustrating a state in which a cleaver lid body illustrated in FIG. 1 is closed.

Then, the cleaver lid body 4 is closed with respect to the cleaver base body 3, as illustrated in FIG. 4. Then, a state in which the slider 8 is locked with respect to the cleaver base body 3 is released by an unlocking piece (not illustrated) provided in the cleaver lid body 4. Accordingly, the slider 8 is moved to the opening portion 3a due to the biasing force of the spring 10 and returns to an initial position (cut completion position), as illustrated in FIGS. 2(b) and 3(d).

In this case, when the blade member 12 moves to the opening portion 3a, the blade member 12 comes in contact with the glass fiber 2a of the optical fiber 2, and the glass fiber 2a is pierced by the blade member 12 so that the glass fiber 2a is cut.

Further, a count indication mechanism 21 for counting and indicating the number of times the slider 8 returns to the initial position (the number of times the optical fiber 2 is cut by the blade member 12) is provided in a front portion of the cleaver base body 3, as illustrated in FIG. 5. An indication window 22 for visually continuing the number indicated by the count indication mechanism 21 is formed in a lower surface of the cleaver base body 3. The count indication mechanism 21 is adapted to indicate the count number in 5 digits.

The count indication mechanism 21 includes five number discs 24 each having a gear portion rotatably supported by a support 23, and five gears 25 rotatably supported by the support 23 and engaging with the gear portions of the respective number discs 24, as illustrated in FIG. 6. Numbers "0," "1," "2," . . . "9" are affixed at equal distances (36 degree distances) on outer peripheral surfaces of the number discs 24. The count indication mechanism 21 is configured so that, when any of the number discs 24 is rotated once, the number disc 24 corresponding to the ones digit of such a number disc 24 counts up by 1. Accordingly, the count indication mechanism 21 can count and indicate the number by 1 from "00000" to "99999." Further, the count indication mechanism 21 has a function of resetting the count number to "00000."

An auxiliary gear 26 is attached to the gear portion of the number disc 24 corresponding to the ones digit. The auxiliary gear 26 rotates with the number disc 24 corresponding to the ones digit.

A rotation member 27 having substantially an "L" shape is rotatably supported by the support 23. Further, two wound springs 28 (see FIG. 11) for biasing the rotation member 27 in a direction horizontal to the upper surface and the lower surface of the cleaver base body 3 are attached to the support 23.

Figure 7:
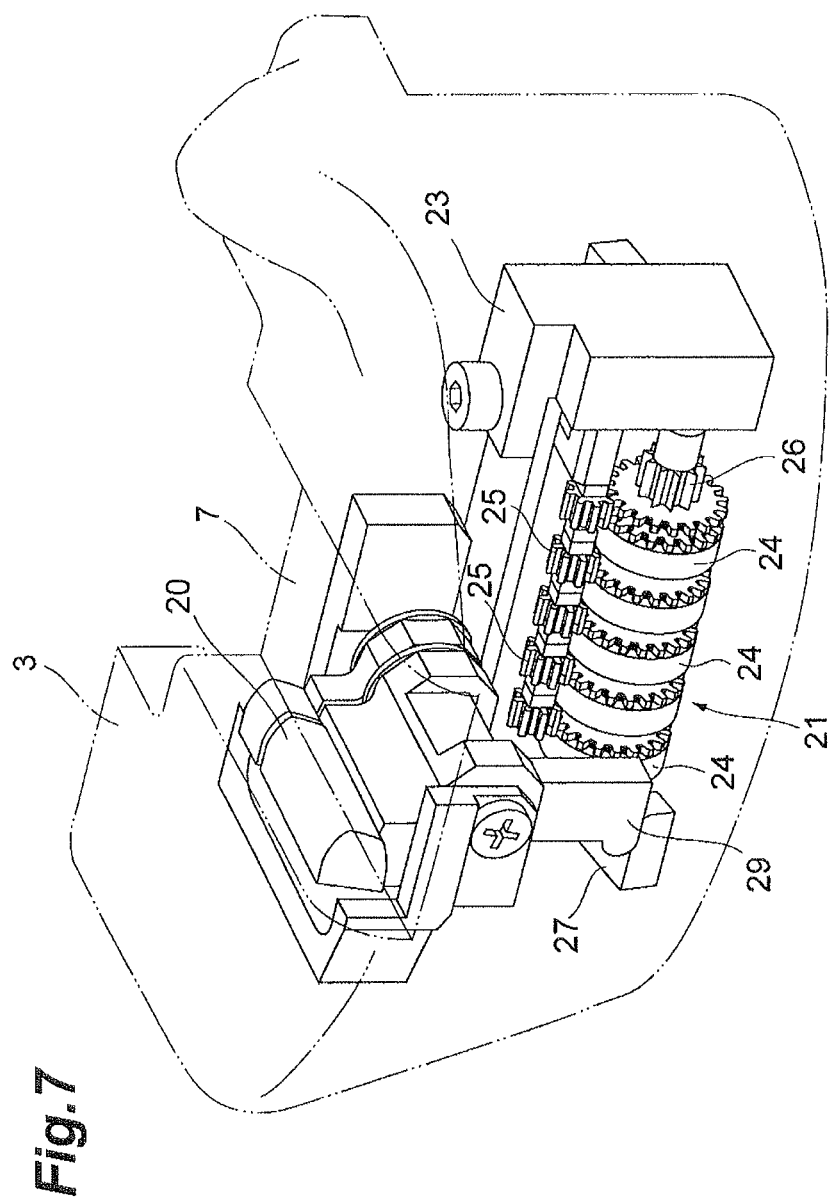
FIG. 7 is a perspective view illustrating a front portion of a cleaver base body when a fiber holder illustrated in FIG. 1 is not set in a holder guide portion.
Figure 9:
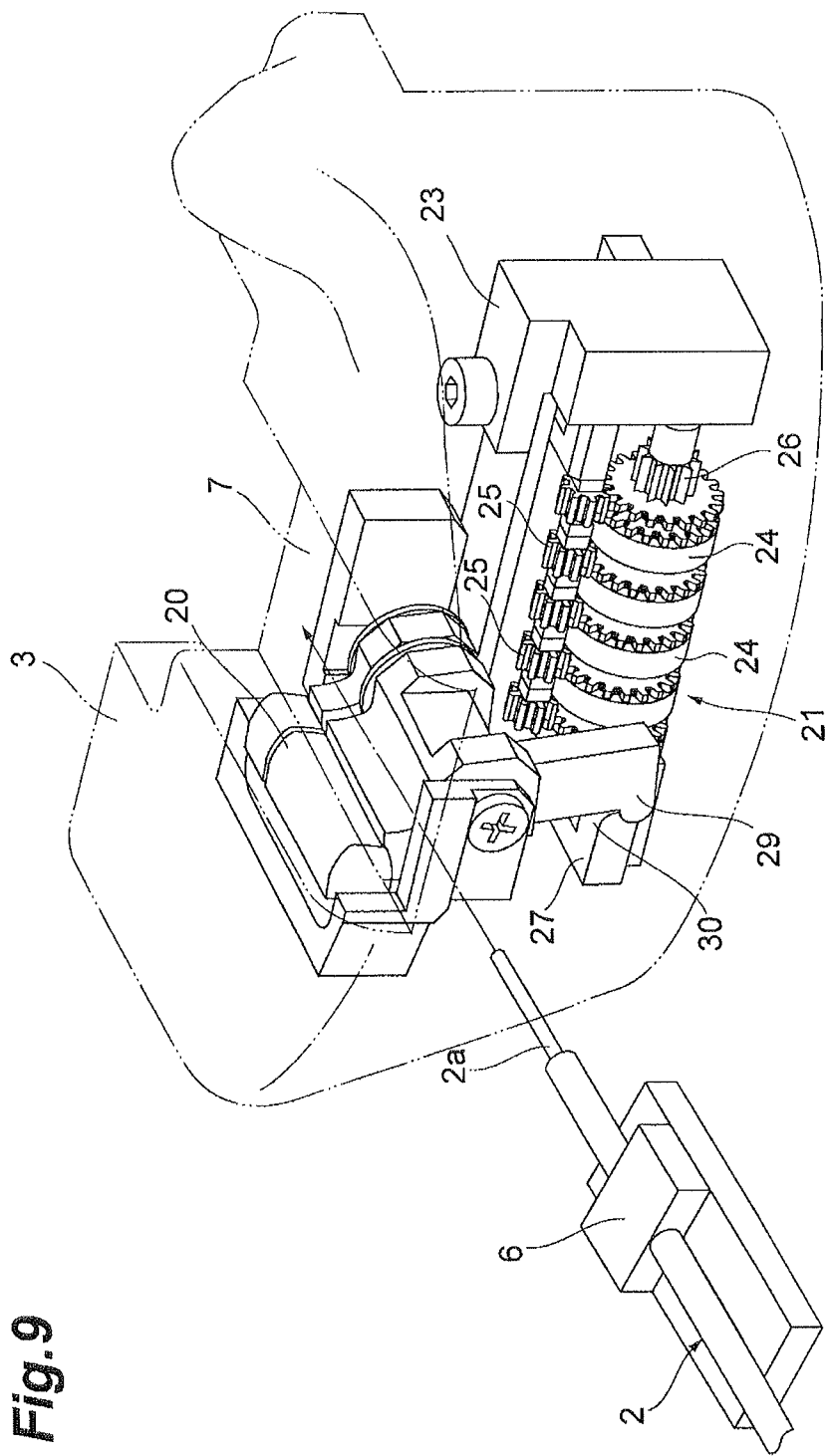
FIG. 9 is a perspective view illustrating an internal structure of the front portion of a cleaver base body when the fiber holder illustrated in FIG. 1 is set in the holder guide portion.

A pawl-side engagement portion 30 engaging with a piece member 29 (see FIG. 7) interlocking with the pawl member 20 described above is provided in an end portion on an opposite side of the slider 8 in the rotation member 27. When the fiber holder 6 is not set in the holder guide portion 7 and the pawl member 20 projects, the piece member 29 presses the pawl-side engagement portion 30 as illustrated in FIGS. 7 and 8, and accordingly the rotation member 27 is inclined by an angle α (e.g., 10.2 degrees) with respect to a horizontal state. On the other hand, when the fiber holder 6 is set in the holder guide portion 7 and the pawl member 20 is retracted to the sidewall, the piece member 29 rotates around a shaft portion (not illustrated) and pressing of the pawl-side engagement portion 30 by the piece member 29 is released, as illustrated in FIGS. 9 and 10. Accordingly, the rotation member 27 enters a horizontal state (an inclination angle is zero) due to the biasing force of the wound spring 28.

A slider-side engagement portion 31 extending in the width direction of the cleaver base body 3 is provided in a portion on the slider 8 side in the rotation member 27, as illustrated in FIGS. 8 and 10. A lower surface of the slider-side engagement portion 31 is an engagement surface 33 engaging with a projecting portion 32 attached to the slider 8. The engagement surface 33 includes a flat surface 33a, and an inclined surface 33b located on the (above-described) opening portion 8a side relative to this flat surface 33a. The inclined surface 33b is formed so that a thickness of the slider-side engagement portion 31 gradually increases toward the opening portion 8a.

Figure 11:
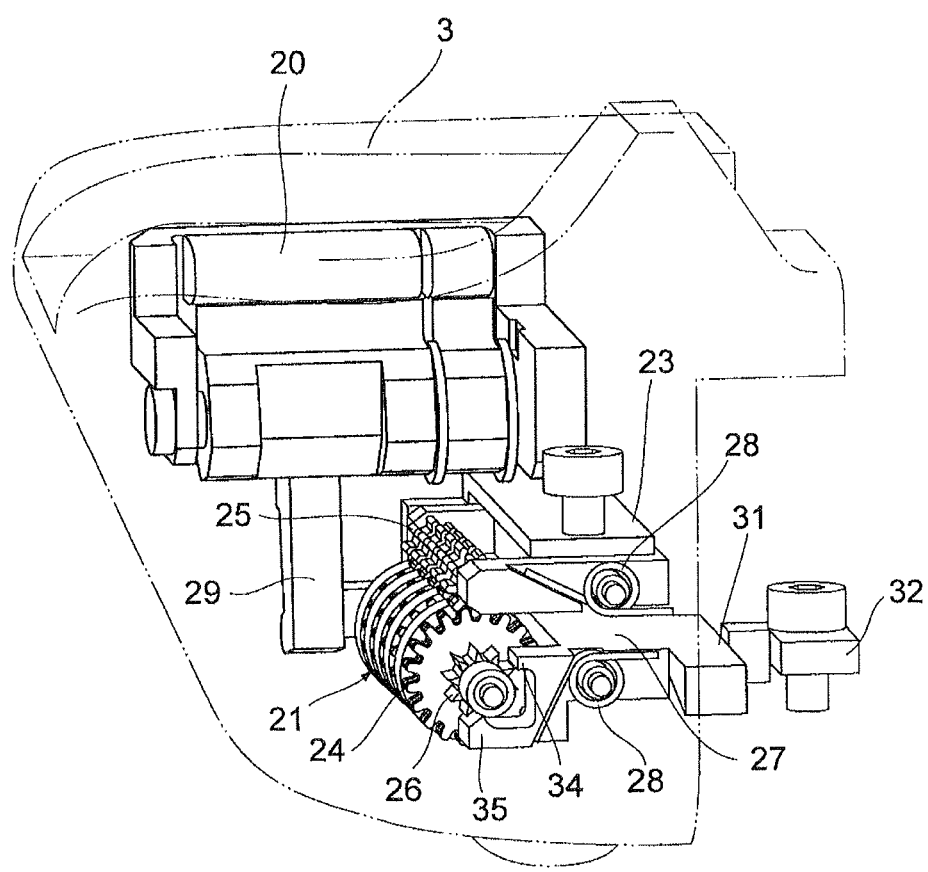
FIG. 11 is a perspective view illustrating an internal structure of the front portion of the cleaver base body when a slider illustrated in FIG. 2 is moved to an initial position.

Further, an upper locking piece 34 engaging with the auxiliary gear 26 and a lower locking piece 35 engaging with the auxiliary gear 26 in a different position and at a different timing from the upper locking piece 34 are provided in the rotation member 27, as illustrated in FIG. 11.

In the above, the pawl member 20, the auxiliary gear 26, the rotation member 27, the wound spring 28, the piece member 29, the projecting portion 32, the upper locking piece 34 and the lower locking piece 35 constitute a control means which mechanically controls the count indication mechanism 21 so that the counting operation of the count indication mechanism 21 is enabled only when the fiber holder 6 is set in the holder guide portion 7.

In this case, the auxiliary gear 26, the rotation member 27, the wound spring 28, the piece member 29, the projecting portion 32, the upper locking piece 34 and the lower locking piece 35 constitute the rotation driving means which rotates the count indication mechanism 21 by an angle corresponding to 1 count only when the slider 8 returns to the initial position in a state in which the pawl member 20 is pressed.

In the optical fiber cleaver 1 configured as above, when the slider 8 is pressed to move to the cut start position when performing a task of cutting the optical fiber 2, the fiber holder 6 is not yet set in the holder guide portion 7. Therefore, the rotation member 27 is inclined by the angle α with respect to the horizontal state as illustrated in FIG. 8, and the projecting portion 32 of the slider 8 does not abut the slider-side engagement portion 31 of the rotation member 27.

Then, when the fiber holder 6 holding the optical fiber 2 is set in the holder guide portion 7, the pawl member 20 is pressed and retracted to the sidewall as described above, the engagement of the piece member 29 and the pawl-side engagement portion 30 of the rotation member 27 is released, and the rotation member 27 enters a horizontal state, as illustrated in FIG. 10. Therefore, the projecting portion 32 abuts the slider-side engagement portion 31.

When the cleaver lid body 4 is closed in this state, the slider 8 having the blade member 12 returns to the initial position such that the optical fiber 2 is cut by the blade member 12, as described above.

Figure 12:
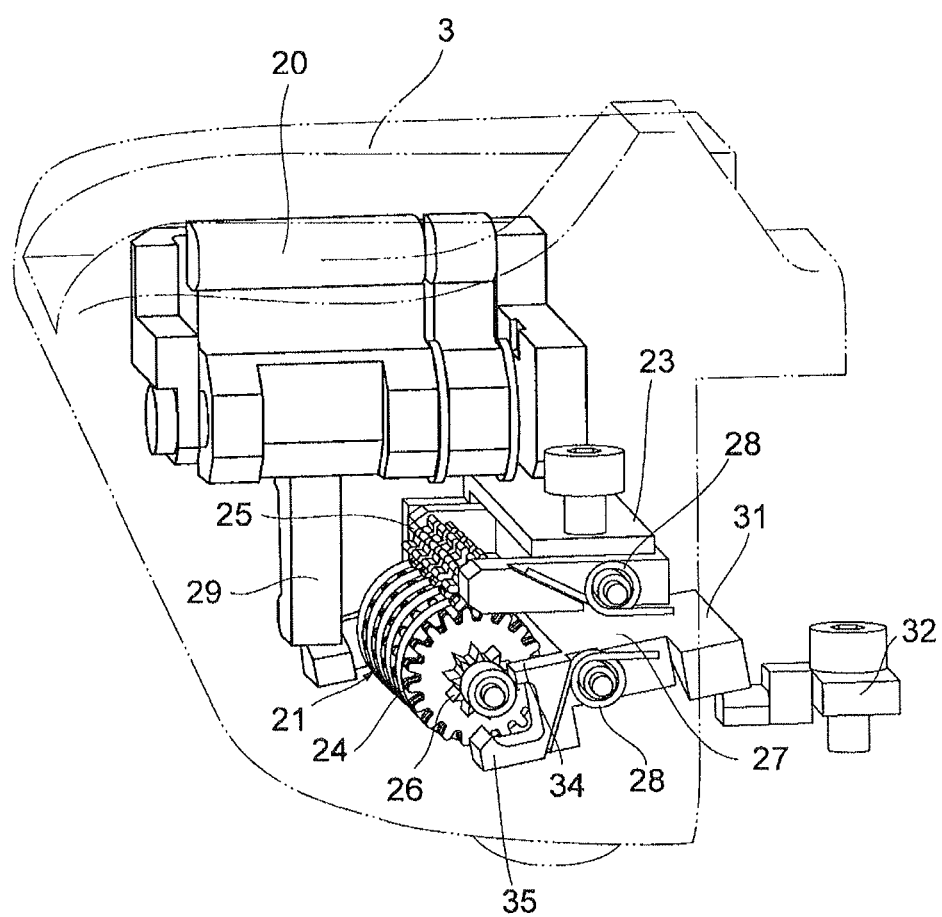
FIG. 12 is a perspective view illustrating an internal structure of the front portion of a cleaver base body when the slider illustrated in FIG. 2 is further moved to the initial position.

In this case, the projecting portion 32 of the slider 8 is moved in a state in which the projecting portion 32 abuts the flat surface 33a of the slider-side engagement portion 31, as illustrated in FIGS. 10 and 11. Also, when the projecting portion 32 reaches the inclined surface 33b of the slider-side engagement portion 31, the rotation member 27 is rotated so that the projecting portion 32 presses the slider-side engagement portion 31 up against the biasing force of the wound spring 28, and therefore the rotation member 27 is inclined by the angle α with respect to the horizontal state again, as illustrated in FIGS. 12 and 13. In this case, the upper locking piece 34 engages with the auxiliary gear 26, the auxiliary gear 26 is rotated by a predetermined angle (18 degrees), and accordingly the number disc 24 corresponding to the ones digit is rotated by the same angle.

Also, when the projecting portion 32 passes the inclined surface 33b of the slider-side engagement portion 31, the rotation member 27 enters the horizontal state due to the biasing force of the wound spring 28 again. In this case, the lower locking piece 35 engages with the auxiliary gear 26, the auxiliary gear 26 is rotated by a predetermined angle (18 degrees) in the same direction as a previous direction, and accordingly the number disc 24 corresponding to the ones digit is rotated by the same angle.

Accordingly, since the number disc 24 corresponding to the ones digit is lastly rotated by 36 degrees, the count indication mechanism 21 counts up by 1. In other words, the slider 8 returns to the initial position such that the count indication mechanism 21 counts up by 1 each time the optical fiber 2 is cut. Engagement with the auxiliary gear 26 in different positions and at different timings is performed using the upper locking piece 34 and the lower locking piece 35 in this way such that, when the number disc 24 is rotated by the same angle, a movement amount of the upper locking piece 34 and the lower locking piece 35 can be reduced. Thus, it is ultimately possible to achieve miniaturization of the optical fiber cleaver 1.

However, when the fiber holder 6 is not set in the holder guide portion 7, the rotation member 27 is inclined by the angle α with respect to the horizontal state as described above and therefore the projecting portion 32 of the slider 8 does not abut the slider-side engagement portion 31 of the rotation member 27. Therefore, even when the slider 8 moves to return to the initial position, the upper locking piece 34 and the lower locking piece 35 do not engage with the auxiliary gear 26, and therefore the number disc 24 corresponding to the ones digit does not rotate. As a result, the count indication mechanism 21 does not count up.

As described above, in the present embodiment, the fiber holder 6 is set in the holder guide portion 7 such that the number of times the slider 8 returns to the initial position is counted by the count indication mechanism 21 only when the pawl member 20 is pressed against the sidewall side. Therefore, when the fiber holder 6 is not set in the holder guide portion 7, the number of times the slider 8 returns to the initial position is not counted by the count indication mechanism 21. Accordingly, the number of cuts of the optical fiber 2 by the blade member 12 can be exactly counted and indicated by the count indication mechanism 21. As a result, it is possible to easily perform management of an exchange time of the blade member 12.

Further, the present invention is not limited to the embodiment described above. For example, while the upper locking piece 34 and the lower locking piece 35 are provided in the rotation member 27, and the auxiliary gear 26 is rotated by 18 degrees when these locking pieces 34 and 35 engage with the auxiliary gear 26 in the embodiment described above, the present invention is not particularly limited to such a configuration, and one engaging piece may be provided in the rotation member 27 and the auxiliary gear 26 may be rotated by 36 degrees when this engaging piece engages with the auxiliary gear 26.

Further, in order to inform a user of an exchange time of the blade member 12, a color for indication may be changed according to the count number of count indication mechanism 21 to request exchange of the blade member 12. For example, the color of indication is green until the count number reaches "50000," the color of indication of the "ten thousands digit" is changed to orange when the count number reaches "50000," and the color of indication is changed to red when the count number is equal to or more than "60000."

Further, when the count number of the count indication mechanism 21 reaches a previously set upper limit, a structure in which a stopper is applied to prevent the blade member 12 from sliding may be included in order to necessarily perform exchange of the blade member 12.

REFERENCE SIGNS LIST

1 . . . Optical fiber cleaver, 2 . . . Optical fiber, 3 . . . Cleaver base body, 4 . . . Cleaver lid body, 6 . . . Fiber holder, 7 . . . Holder guide portion, 8 . . . Slider, 12 . . . Blade member, 20 . . . Pawl member (control means), 21 . . . Count indication mechanism, 26 . . . Auxiliary gear (rotation driving means or control means), 27 . . . Rotation member (rotation driving means or control means), 28 . . . Wound spring (rotation driving means or control means), 29 . . . Piece member (rotation driving means or control means), 31 . . . Slider-side engagement portion, 32 . . . Projecting portion (rotation driving means or control means), 33 . . . Engagement surface, 33b . . . Inclined surface, 34 . . . Upper engagement piece (rotation driving means or control means), 35 . . . Lower engagement piece (rotation driving means or control means)

The invention claimed is:

1. An optical fiber cleaver for cutting an optical fiber, the optical fiber cleaver comprising:
a cleaver base body including a holder guide portion which positions a fiber holder holding the optical fiber;
a cleaver lid body attached to the cleaver base body so as to be openable and closable;
a slider attached to the cleaver base body so as to be movable between a cut start position from which cutting of the fiber is started and a cut completion position at which cutting of the fiber is completed, and including a blade member which pierces the optical fiber when returning from the cut start position to the cut completion position, the slider moving with the blade member from the cut start position to the cut completion position when closing the cleaver lid body with respect to the cleaver base body, and moving from the cut start position to the cut completion position by closing the cleaver lid body with respect to the cleaver base body;
a count indication mechanism provided in the cleaver base body for counting and indicating the number of times the slider returns from the cut start position to the cut completion position;
a control means which mechanically controls the count indication mechanism to enable a counting operation of the count indication mechanism only when the fiber holder is set in the holder guide portion,
wherein the control means comprises a pawl member provided in the holder guide portion and pressed when the fiber holder is set in the holder guide portion; and a rotation driving means which rotates the count indication mechanism by an angle corresponding to one count only when the slider returns to an initial position in a state in which the pawl member is pressed, and
wherein the rotation driving means comprises a projecting portion provided in the slider; a rotation member provided in the cleaver base body to rotate in interlock with the pawl member and including an engagement portion which engages with the projecting portion when the pawl member is pressed; an auxiliary gear attached to the count indication mechanism; and an engagement piece provided in the rotation member and engaging with the auxiliary gear.

2. The optical fiber cleaver according to claim 1, wherein:

the engagement portion includes an inclined surface inclined to rotate the rotation member as the projecting portion is directed to the initial position in a state in which the pawl member is pressed, the number of engagement pieces is two, and the two engaging pieces engage with the auxiliary gear in different positions and at different timings.

\* \* \* \* \*